UNITED STATES PATENT OFFICE.

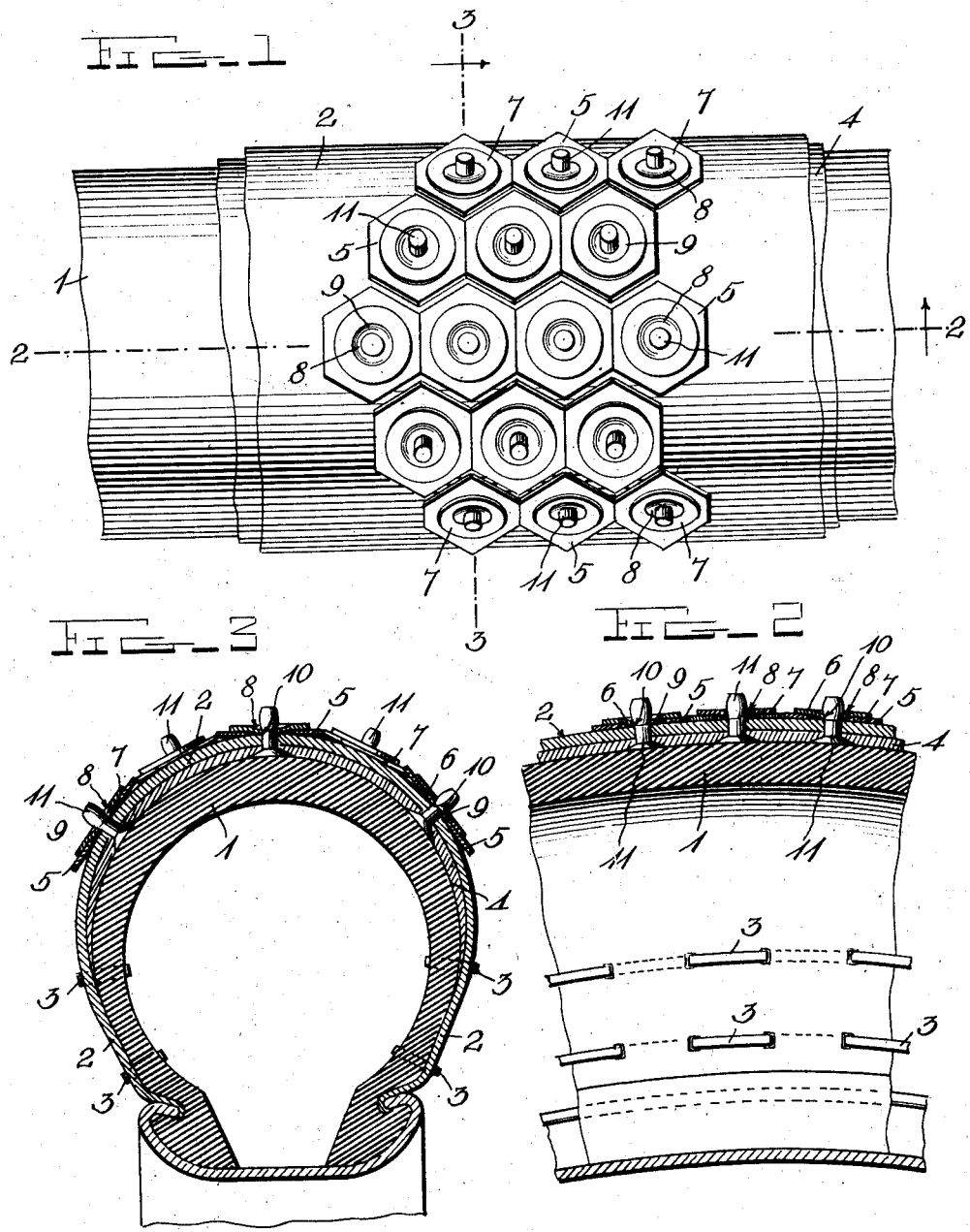

ISAAC J. D. FAIRHURST, OF ORFORDVILLE, WISCONSIN.

ANTISLIPPING TIRE-COVER.

No. 901,528.

Specification of Letters Patent.

Patented Oct. 20, 1908.

Application filed August 19, 1907. Serial No. 389,209.

*To all whom it may concern:*

Be it known that I, ISAAC J. D. FAIRHURST, a citizen of the United States, residing at Orfordville, in the county of Rock and State of Wisconsin, have invented certain new and useful Improvements in Antislipping Tire-Covers; and I do declare the following to be a full, clear, and exact description of the invention, such as will enable others skilled in the art to which it appertains to make and use the same.

This invention has relation to new and useful improvements in anti-slipping tire covers for automobiles or other vehicle tires, and has for its object to provide a simple and durable tire cover adapted to be easily and readily applied in position, through the use of which skidding or slipping of vehicles may be eliminated.

With the foregoing and other objects in view, the invention consists of certain novel features of construction, combination and arrangement of parts, as will be more fully described and particularly pointed out in the appended claim.

In the accompanying drawings,—Figure 1 is a top plan view of a portion of a tire cover constructed in accordance with the invention applied to a corresponding portion of a tire; Fig. 2 is a longitudinal sectional view cut on the line 2—2 of Fig. 1; and Fig. 3 is a cross section of Fig. 1.

Referring to the drawings for a more particular description of the invention, the numeral 1 indicates a tire of any suitable form.

In carrying out the invention, a cover 2 of leather, rawhide or other suitable material having a sufficient flexibility, is positioned or arranged over the tire and is fastened or laced at its side edges thereto by flexible strings 3.

In lacing the cover to the tire, the stitches may be arranged in any suitable manner and be of any suitable length or lengths, as is found most desirable in the application of the invention. A flexible strip 4 of leather, rawhide, or other suitable material is also arranged over the tread portion of the tire under the cover, and coöperates with the cover to form a securing means for the anti-skidding devices. These devices are arranged over the cover and comprise inner or base plates 5 of hexagonal form, with central preferably circular openings or apertures 6, and are arranged in contiguous relation to cover the tread portion of the cover. Outer plates 7, constituting burs, having central circular depressions or recesses 8 formed in their outer faces and corresponding outwardly extending portions 9 on their inner or under faces adapted to seat or fit in the openings or apertures of the inner or base plates 5, are arranged over said plates. Said outer plates are also provided with central transverse apertures or perforations 10, the purpose of which will be disclosed. To fasten said flexible strip 4 and plates 5 and 7, respectively in position to the cover, rivets or fastening members 11 are employed and are arranged to work through said flexible strip and cover and through the apertures in said plates. The bases of these rivets or fastening members are somewhat enlarged to securely engage or embrace the under surfaces or faces of the flexible strip, while the outer or opposite ends of the rivets engage the outer plates and project a suitable distance beyond the same, said projecting portions constituting spurs to coact with the plates in preventing skidding or slipping of the vehicle to which my improved tire cover may be applied.

It is to be particularly noted that by forming recesses or depressions in the outer plates 7 the rivets or fastening members could not by any possibility become loosened until after said plates have become worn below said recesses.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having described my invention, I claim:—

In combination with a tire, a flexible cover arranged over the same; a flexible strip arranged over the tread portion of the tire under the cover, centrally apertured base plates arranged over the tread portion of the cover, outer plates formed with centrally apertured recessed portions arranged over the base plates with their recessed portions extending into the apertures thereof to points flush with the inner faces of the same and fastening rivets extending through the flexible strip, the tire cover and through the apertures of the base and outer plates, respectively, the outer ends of the rivets being slightly enlarged to engage the recessed portions of the outer plates and projecting beyond the same.

In testimony whereof I have hereunto set my hand in presence of two subscribing witnesses.

ISAAC J. D. FAIRHURST.

Witnesses:
F. S. COLE,
MATT CANTINI.